United States Patent
Suzuki et al.

(10) Patent No.: US 11,538,424 B2
(45) Date of Patent: Dec. 27, 2022

(54) SELF-CALIBRATING ILLUMINATION MODULES FOR DISPLAY BACKLIGHT

(71) Applicant: Microsoft Technology Licensing, LLC, Redmond, WA (US)

(72) Inventors: Nobuyuki Suzuki, Kirkland, WA (US); Andrew N Cady, Kirkland, WA (US); Sang Hyok Yoo, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/241,845

(22) Filed: Apr. 27, 2021

(65) Prior Publication Data

US 2022/0343866 A1 Oct. 27, 2022

(51) Int. Cl.
*G09G 3/34* (2006.01)
*G09G 3/36* (2006.01)
*G02F 1/13357* (2006.01)

(52) U.S. Cl.
CPC ..... *G09G 3/3426* (2013.01); *G02F 1/133603* (2013.01); *G09G 3/3611* (2013.01); *G09G 2320/045* (2013.01); *G09G 2320/064* (2013.01); *G09G 2320/0693* (2013.01); *G09G 2360/14* (2013.01); *G09G 2360/141* (2013.01); *G09G 2360/16* (2013.01)

(58) Field of Classification Search
CPC ............ G09G 3/006; G09G 3/22; G09G 3/34; G09G 3/3406; G09G 3/3413; G09G 3/342; G09G 3/3426; G09G 3/3611; G09G 2320/0233; G09G 2320/029; G09G 2320/0295; G09G 2320/043; G09G 2320/045; G09G 2320/0626; G09G 2320/0633; G09G 2320/064; G09G 2320/0646; G09G 2320/0686; G09G 2330/12; G09G 2360/14; G09G 2360/141; G09G 2360/142; G09G 2360/145; G09G 2360/147; G09G 2360/148; G09G 2360/16; G09G 2320/0693; G02F 1/133514; G02F 1/1336; G02F 1/133602; G02F 1/133603; G02F 1/133611; G02F 1/133621; H05B 45/10; H05B 45/12; H05B 45/14
See application file for complete search history.

(56) References Cited

U.S. PATENT DOCUMENTS

| | | | |
|---|---|---|---|
| 7,064,733 B2 | 6/2006 | Cok et al. | |
| 7,393,128 B2 | 7/2008 | Sakai et al. | |
| 2005/0073495 A1* | 4/2005 | Harbers | G02F 1/133603 345/102 |

(Continued)

*Primary Examiner* — Keith L Crawley
(74) *Attorney, Agent, or Firm* — Alleman Hall Creasman & Tuttle LLP

(57) ABSTRACT

A display device is provided that includes a display panel and a backlight panel. The backlight panel includes a plurality of self-calibrating illumination modules configured to provide backlighting for the display panel. Each self-calibrating illumination module includes at least one light source configured to emit light toward the display panel, at least one light sensor configured to detect light emitted from the at least one light source that is internally reflected within the display device, and a controller configured to control a current supplied to the at least one light source based at least on an intensity of light detected by the at least one light sensor.

19 Claims, 10 Drawing Sheets

(56) References Cited

U.S. PATENT DOCUMENTS

| | | |
|---|---|---|
| 2006/0227085 A1 | 10/2006 | Boldt et al. |
| 2008/0238860 A1 | 10/2008 | Onodera |
| 2009/0001251 A1* | 1/2009 | Ng .......................... G01J 3/50 |
| | | 250/205 |
| 2009/0179843 A1 | 7/2009 | Ackermann et al. |
| 2010/0007600 A1 | 1/2010 | Deurenberg et al. |
| 2011/0002140 A1* | 1/2011 | Tsukahara ............. B32B 27/286 |
| | | 362/602 |
| 2011/0069094 A1* | 3/2011 | Knapp ................... H05B 45/20 |
| | | 345/690 |
| 2013/0147860 A1* | 6/2013 | Ishida ...................... G09G 3/20 |
| | | 345/690 |
| 2013/0242056 A1* | 9/2013 | Fleck ................. G02B 26/0833 |
| | | 348/47 |
| 2014/0333593 A1* | 11/2014 | Nagashima .......... G09G 3/3426 |
| | | 345/207 |
| 2017/0076677 A1 | 3/2017 | Lin et al. |
| 2021/0011301 A1 | 1/2021 | Chen et al. |

\* cited by examiner

SELF-CALIBRATING ILLUMINATION MODULES FOR DISPLAY BACKLIGHT

BACKGROUND

Multi-segment dimming backlight panel technology for liquid crystal displays (LCD) provides enhanced color and light contrast in the video content being played. The enhanced contrast in color and light intensity provides a better view experience of high dynamic range (HDR) content. By using multi-segment dimming backlight panels, sections of the display showing a sunny sky may be visually contrasted with sections of the display showing a shaded portion of the ground.

SUMMARY

A display device is provided comprising a display panel, and a backlight panel including a plurality of self-calibrating illumination modules configured to provide backlighting for the display panel. Each self-calibrating illumination module may include at least one light source configured to emit light toward the display panel, at least one light sensor configured to detect light emitted from the at least one light source that is internally reflected within the display device, and a controller configured to control a current supplied to the at least one light source based at least on an intensity of light detected by the at least one light sensor.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Displays equipped with multi-segment dimming panels that provide backlighting for liquid crystal display (LCD) panels have become an increasingly popular technology for presenting high dynamic range (HDR) content. These types of displays may enhance the color and light contrast in the video content being played, which may provide a better viewing experience of HDR content for users. Additionally, backlight panels that use miniaturized light-emitting diodes may be manufactured with thinner panels compared to conventional LED beads, which may provide benefits for enabling multi-segment backlight displays for small form-factor devices, such as, for example, handheld devices, tablets, laptops, wearable devices, etc.

However, current multi-segment dimming backlight technologies have several challenging issues that may potentially degrade user experience. For example, one challenging issue for multi-segment dimming backlight technology is achieving uniformity in luminance for a target dimming value. Typically, the luminance of each LED in a backlight panel may vary even with the same driving current being applied to those LEDs. Currently, manufacturers often perform calibration processes on every backlight panel during manufacture to individually calibrate each of the segments in those panels in order to achieve uniformity in luminance for the same driving current. These calibration processes are typically performed at the system or LCD production site by the optical measurement. The calibration factors determined using the optical measurements may be stored in memory of the display, and are applied at run-time during display of video content.

However, these calibration processes typically require human input and can be time intensive, which may significantly increase the costs for manufacturing the displays. Further, as LED characteristics including luminance in response to a given drive current may change as the LED ages, the performance of each LED in a backlight panel may deviate from its original performance at the time of manufacture. These deviations can cause the calibration data to become erroneous over time and ineffective at achieving accurate luminance, which may cause non-uniformity in the backlighting of the display. These issues may potentially degrade the user experience of the display.

Figure 1:
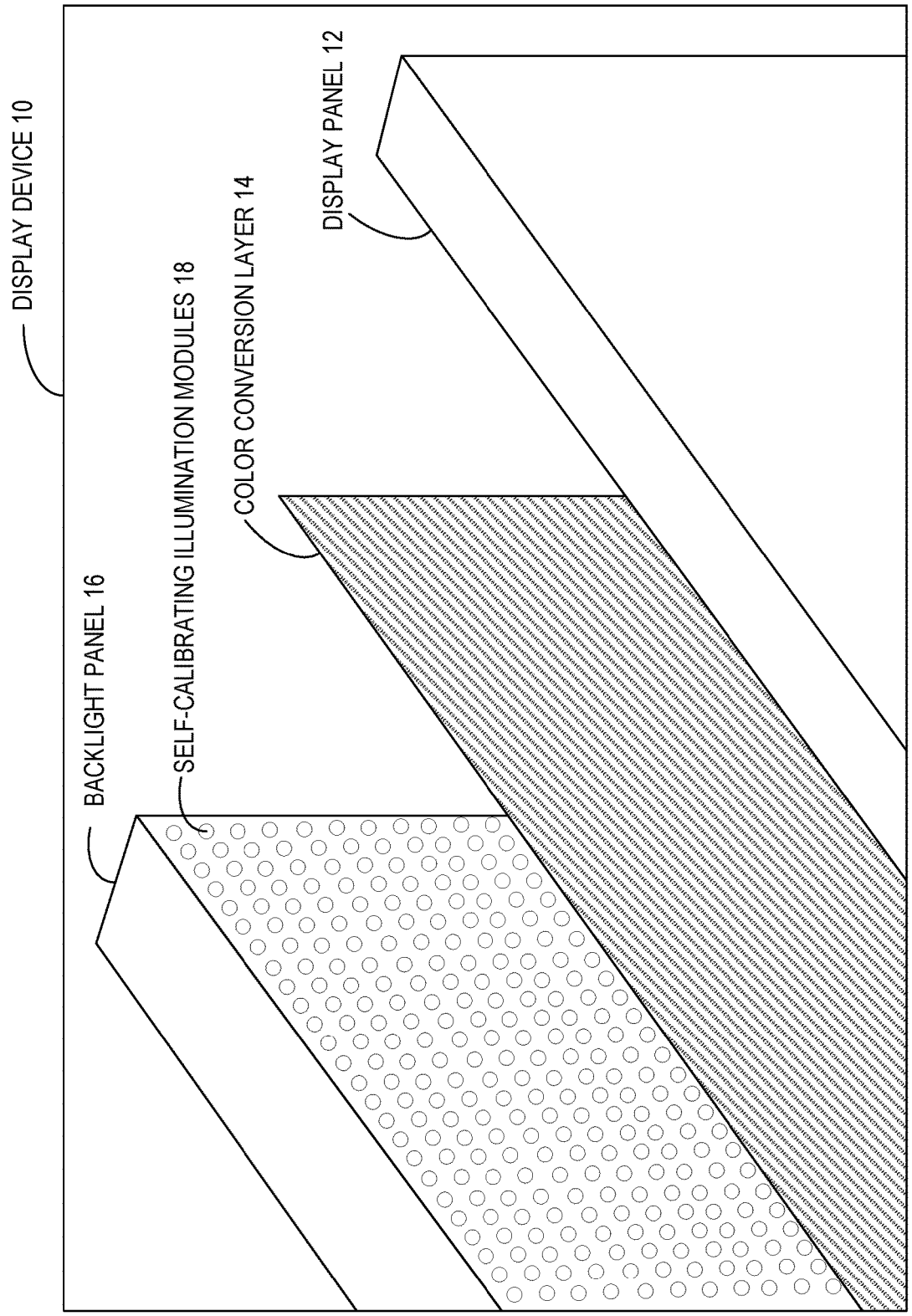
FIG. 1 shows a display device that includes a plurality of self-calibrating illumination modules arranged in an array for a backlight of the display device, according to one embodiment of the subject disclosure.

To address these issues, FIG. 1 illustrates an example display device 10 that includes a multi-segment dimming backlight panel that uses self-calibrating illumination modules, as will be described in more detail below. By using self-calibrating illumination modules, luminance non-uniformity in the backlight panel may be mitigated without requiring a manufacturer calibration process using optical measurements, which may reduce manufacturer costs for the display.

The display device 10 may take the form of a stand-alone display for a computer, a display integrated in a laptop or tablet device, a display of a wearable device, or another type of display device. In the illustrated example, the display device 10 includes a display panel 12, a color conversion layer 14, and a backlight panel 16. The display panel 12 may take the form of a liquid crystal display (LCD) panel that uses the light-modulating properties of liquid crystals and a backlight panel to images. However, it should be appreciated that other display technologies that do not produce light by themselves, and use a backlight to produce visible images may also be used for the display panel 12.

The color conversion layer 14 is arranged between the backlight panel 16 and the display panel 12. In one example, the color conversion layer 14 may take the form of a quantum dot layer that converts light emitted from the backlight panel 16 to respective monochromatic colors. Specifically, the color conversion layer 14 may include photo-emissive nanocrystals which are capable of naturally emitting monochromatic light when excited from an impinging light source. The backlight panel 16 may be configured to emit blue light, or another high-energy wavelength of light, toward the color conversion layer 14, which supplies the energy required for the quantum dots to fluoresce. In one example, the quantum dots may be configured to fluoresce white light. However, it should be appreciated that other types of color conversion or color filter technologies may be used for the color conversion layer 14.

The backlight panel 16 is a multi-segment dimming backlight panel that includes a plurality of a plurality of self-calibrating illumination modules 18 configured to provide backlighting for the display panel 12. As illustrated in FIG. 1, the plurality of self-calibrating illumination modules 18 may be arranged in an array or grid on the backlight panel 16, or another segmented formation of modules. Typically, the backlight panel 16 may include an array of thousands of self-calibrating illumination modules 18, which may take the form of mini light emitting diode (LED) modules that share a system bus and power supply of the display device 10. Each of the individual self-calibrating illumination modules 18 is capable of controlling and calibrating a luminance characteristic of that module based on an integrated light sensor.

Figure 2:
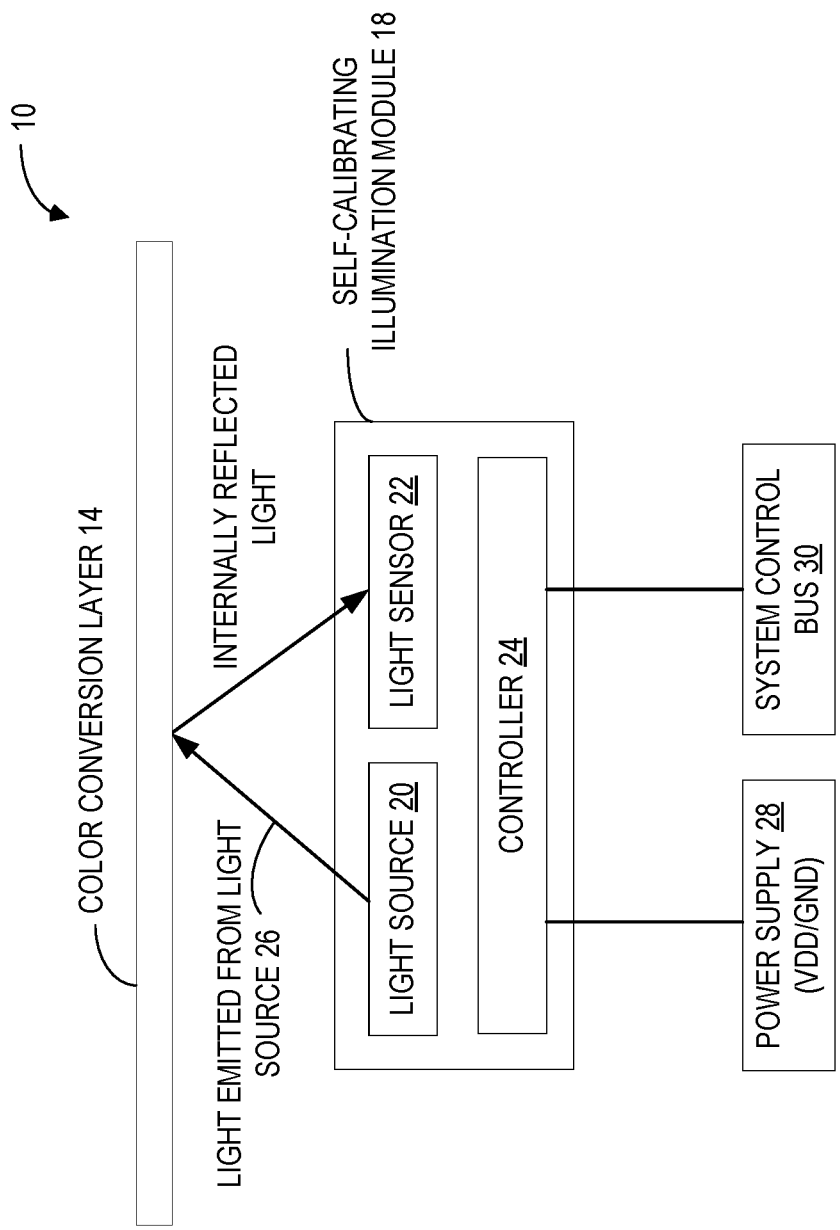
FIG. 2 shows a schematic view of an internal reflection of light emitted from a light source of a self-calibrating illumination module within the display device of FIG. 1.

FIG. 2 illustrates an example self-calibrating illumination module 18 that may be included in the backlight panel 16 of the display device 10. The example self-calibrating illumination module 18 shown in FIG. 2 may be formed within each of the plurality of illumination modules in the array arranged on the backlight panel 16 shown in FIG. 1. Thus, each illumination module 18 of the backlight panel 16 may perform its own individual self-calibration functions that are separate from the other illumination modules in the array.

The self-calibrating illumination module 18 may include at least one light source 20, at least one light sensor 22, and a controller 24. The at least one light source 20 may take the form of an LED, a mini-LED, or another type of photo-emissive element. The at least one light source 20 is arranged to emit light toward the display panel 12, and through the color conversion layer 14 of the display device 10. In one example, the at least one light source 20 may be configured to emit blue light, or another high-energy wavelength of light.

As illustrated in FIG. 2, the at least one light sensor 22 may be configured to detect light 26 emitted from the at least one light source 20 that is internally reflected within the display device 10. In one example, the light 26 emitted from the light source 20 is internally reflected off the surface of the color conversion layer 14. In this example, the color conversion layer 14 has a substantially uniform reflectivity across the entire layer. As a specific example, the color conversion layer 14 may take the form of a quantum dot layer that is manufactured to have a substantially uniform reflectivity across the layer. By having a substantially uniform reflectivity, the color conversion layer 14 will reflect the incident light from each self-calibrating illumination module back toward each of those self-calibrating illumination modules with the same or substantially similar reflective characteristics, such as, for example, an angle of reflection, a reflection coefficient, etc. Thus, the effect of the reflective surface on the reflected light emitted by each self-calibrating illumination module will be substantially similar, which may mitigate potential differences in calibration among the self-calibrating illumination modules that may be caused by emitted light being reflected differently for each self-calibrating illumination module. Further, in some examples, the display device 10 may not include a color conversion layer 14. In these examples, the light emitted from the self-calibrating illumination modules 18 may be internally reflected off of a different layer of the display device 10, such as, for example, a back surface of the display panel 12. In this example, the back surface of the display panel 12 that is facing the backlight panel 16 may be manufactured to be at least partially reflective, and may be manufactured to have a substantially uniform reflectivity across the surface.

As discussed above, at least a portion of the light 26 emitted from the light source 20 of each self-calibrating illumination module 18 is reflected off the color conversion layer 14, or another layer of the display device 10, back toward the respective self-calibrating illumination module 18. The respective light sensor 22 of each self-calibrating illumination module 18 is arranged adjacent to the respective light source 20, and is configured to detect an intensity value for that internally reflected light for that self-calibrating illumination module 18. In this manner, the light sensor 22 may measure a luminance characteristic of the associated light source 20 in real-time as the display device 10 is used.

The controller 24 is coupled to a power supply 28 and a system control bus 30 of the display device 10. The controller 24 may be configured to control a current supplied by the power supply 28 to the at least one light source 20 to achieve a target luminance that may be set by the display device 10. To perform the self-calibration function described herein, the controller 24 may control the current supplied to the at least one light source 20 based at least on an intensity of light detected by the at least one light sensor 22 for the light that has been emitted by the light source 20 and internally reflected off of the color conversion layer 14, or another layer of the display device 10. In this manner, each individual illumination module 18 may self-calibrate based at least on detected light intensity values in real-time.

Figure 3A:
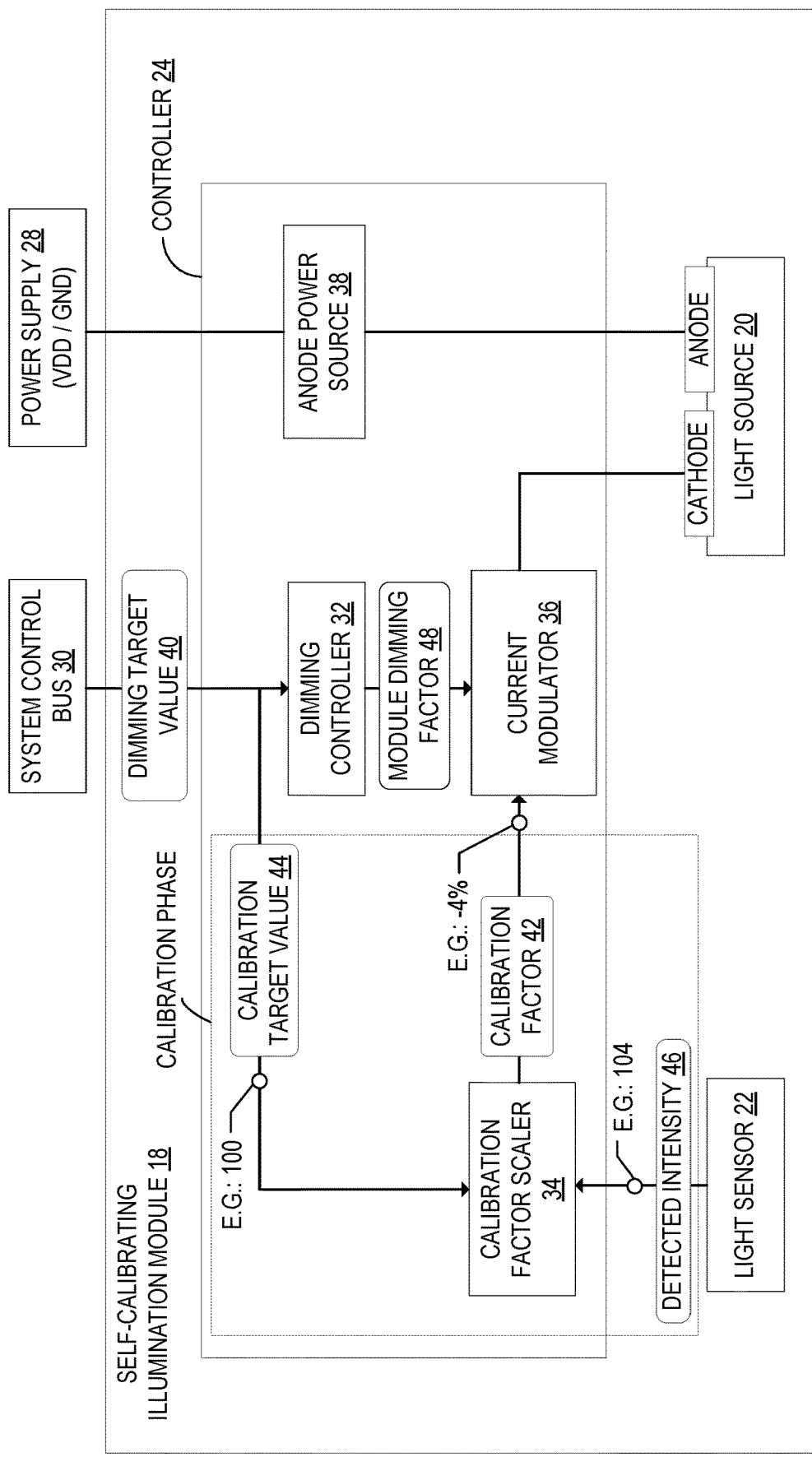
FIG. 3A shows a schematic view of a controller of a self-calibrating illumination module that performs a self-calibration process during a calibration phase for a backlight of the display device of FIG. 1.

FIG. 3A shows a schematic view of each self-calibrating illumination module 18. As shown, the controller 24 of the self-calibrating illumination module 18 may include several logic components including a dimming controller 32, a calibration factor scaler 34, a current modulator 36, and an anode power source 38. However, it should be appreciated that the controller 24 may include other suitable components for controlling the power supplied to the light source 20.

The dimming controller 32 of the controller 24 may be configured to receive a dimming target value 40 for the at least one light source 20 of that self-calibrating illumination module 18. As will be discussed in further detail below, the dimming target value 40 may be generated by a timing controller of the display device 10, and may represent a dimming value that should be achieved by that specific illumination module 18 of the backlight panel. The dimming target value 40 may be received via the system control bus 30 of the display device 10. In one example, the dimming controller 32 does not receive a calibration factor that is determined from a calibration process performed during manufacturing of the display device 10. Rather, the controller 24 of the illumination module 18 is configured to perform self-calibration functions to achieve the dimming target value 40 for the light source 20.

The dimming controller 32 may be configured to control the current modulator 36 to modulate the current supplied to the light source 20 via the anode power source 38 based at least on the dimming target value 40 received via the system control bus 30. The powered light source 20 will emit light toward the display panel of the display device 10. Some of the emitted light will be internally reflected off of the color conversion layer 14 back toward the light sensor 22, which is configured to measure an intensity of the light.

In the example illustrated in FIG. 3A, the self-calibrating illumination module 18 may be configured to perform self-calibration during a calibration phase. The calibration phase may be performed at a calibration opportunity, such as, for example, a period of time during a start-up phase of the display or a shut-down phase of the display. For example, the display device 10 may be configured to include a calibration phase during a start-up and/or shut-down process for the display. The calibration phase may also be performed at other types of calibration opportunities. For example, if the content being displayed on the display device 10 includes a frame that has a substantially uniform and bright luminance for each pixel in the frame, the display device 10 may be configured to determine that the frame of the content is a calibration opportunity and may send an instruction to the self-calibrating illumination modules 18 to perform the self-calibration process described herein during the presentation of that frame of the display content. As another example, the display device 10 may be configured to instruct individual self-calibrating illumination modules 18 to perform the self-calibration process when the dimming target value 40 for that self-calibrating illumination module is above a predetermined threshold of intensity. However, it should be appreciated that other suitable calibration opportunities may be used to trigger and perform the self-calibration process described herein.

During the calibration phase, an instruction to perform the calibration and a calibration target value 44 may be sent to each self-calibrating illumination module 18. In another example, each self-calibrating illumination module 18 may store a default value for the calibration target value 44 for performing the self-calibration process. The controller 24 of each self-calibrating illumination module 18 may be configured to control the current supplied to the at least one light source 20 based at least on the calibration target value 44 to cause the at least one light source 20 to emit light. As discussed above, the emitted light is internally reflected within the display device 10 back toward that illumination module. The controller 24 is further configured to detect, via the light sensor 22, an intensity 46 of the light emitted from the at least one light source 20 that is internally reflected within the display device 10. The calibration factor scaler 34 of the controller 24 may receive both the calibration target value 44 and the measured intensity 46 of the light emitted from the light source 20. The calibration factor scaler 34 may be configured to determine a calibration factor 42 for that self-calibrating illumination module 18 based at least on a comparison between the calibration target value 44 and the detected intensity 46 of the light emitted from the at least one light source 20.

In the example illustrated in FIG. 3A, the calibration target value 44 may have a value of "100", which is a relative value that may correspond to a range of luminance values for light emitted from the light source 20. In other examples, the calibration target value 44 may have an absolute luminance value, a normalized value, or another type of value to represent the output of the light source 20. Further in the example illustrated in FIG. 3A, the light sensor 22 detects an intensity value of "104" for the light emitted from the light source 20 and internally reflected within the display device 10. In this example, the current supplied to the light source 20 was controlled by the current modulator 36 to achieve the luminance value represented by the calibration target value 44. However, due to the specific luminance characteristics of the light source 20, the intensity of the emitted light was higher than intended, having a detected value of "104" in the illustrated example. The calibration factor scaler 34 compares the detected intensity 46 of "104" to the calibration target value 44 of "100", and determines the calibration factor 42 based at least on the comparison. In the illustrated example, the light emitted from the light source 20 overshot the intended calibration target value by 4%, thus the calibration factor scaler 34 may be configured to determine a calibration factor 42 of "−4%" for that self-calibrating illumination module 18. The calibration factor 42 of "−4%" is sent to the current modulator 36, which may then use the calibration factor 42 during runtime to control the current supplied to the light source 20. The calibration factor 42 may be updated as new calibration phases are performed at subsequent calibration opportunities of the display device 10.

As illustrated in FIG. 3A, during a runtime phase where content is being presented on the display device 10, the controller 24 of the self-calibrating illumination module 18 may be configured to receive a dimming target value 40 for the at least one light source 20. The dimming target value 40 may be processed by a dimming controller 32 of the controller 24. The dimming controller 32 may be configured to determine a module dimming factor 48 based at least on the dimming target value 40. For example, the dimming target value 40 may take the form of a value between 0% and 100%, which represents a range of intensities for the light emitted by the light source 20. The dimming controller 32 may be configured to determine a module dimming factor 48 based at least on the dimming target value 40. The module dimming factor 48 may, for example, be a current value for controlling the current supplied to the light source 20 to achieve the dimming target value 40 for that specific self-calibration illumination module 18. The module dimming factor 48 may depend upon module specific characteristics of that self-calibrating illumination module 18, such as, for example, characteristics of the anode power source 38, the light source 20, the current modulator 36, etc.

The dimming controller 32 may send the module dimming factor 48 to the current modulator 36. The current modulator 36 of the controller 24 may then control the current supplied to the at least one light source 20 based at least on the determined calibration factor 42 for that self-calibrating illumination module 18 and the module dimming factor 48 that was determined based at least on the dimming target value 40 for that module. In this manner, the controller 24 may control the current supplied to the light source 20 to achieve the specified dimming target value 40 received via the system control bus 30.

As discussed above, the luminance characteristics of the light source 20 may potentially change over time as the light source is used. However, using the self-calibrating process described above, the self-calibrating illumination module 18 may perform the self-calibration process at each calibration phase to adjust the calibration factor 42 in accordance with the changing luminance characteristics of the light source 20.

Figure 3B:
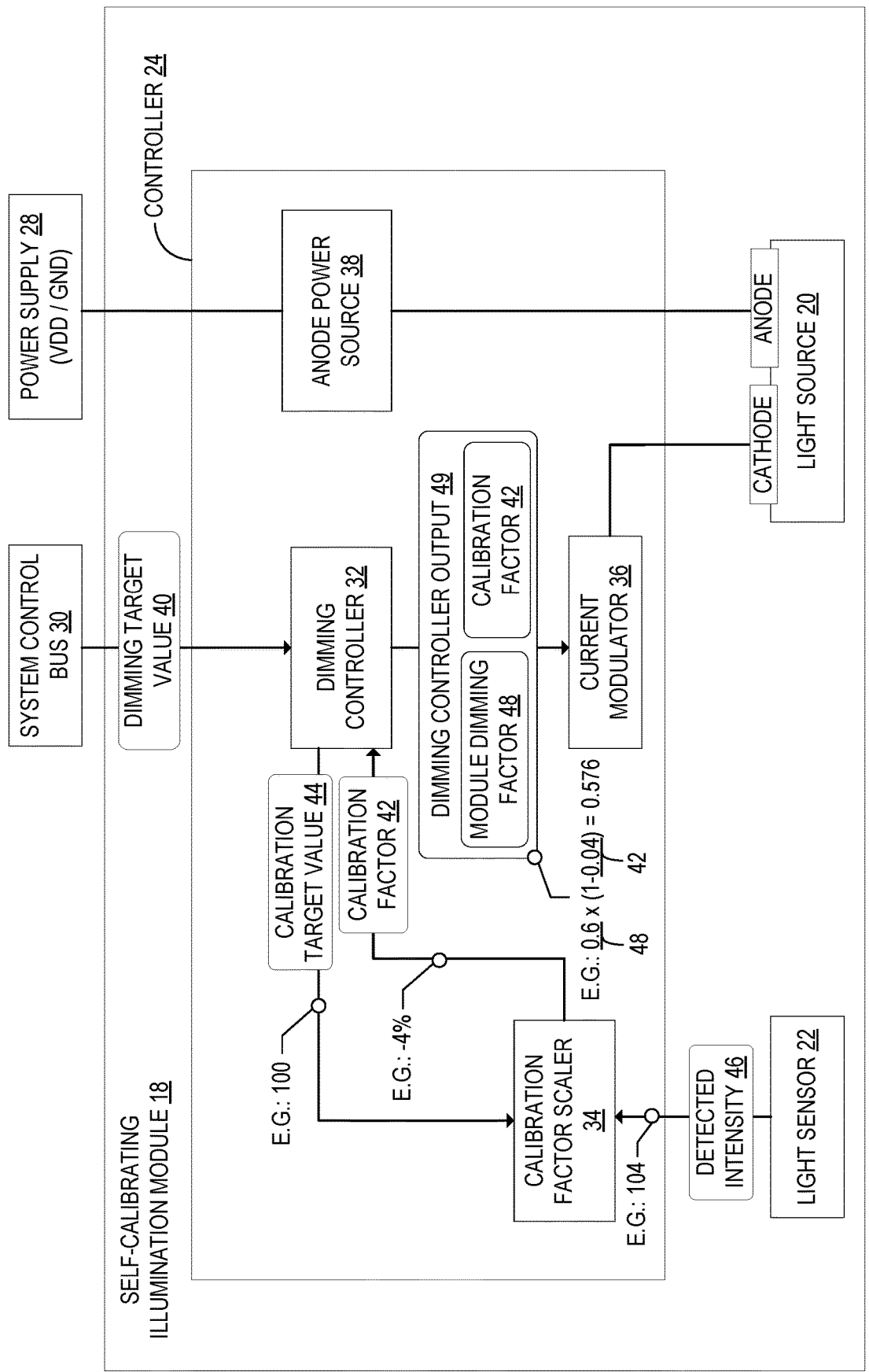
FIG. 3B shows a schematic view of a controller of a self-calibrating illumination module that perform a continuous self-calibration process for a backlight of the display device of FIG. 1.

FIG. 3B shows a schematic view of a self-calibrating illumination module 18 that performs a continuous self-calibration process that is performed during runtime of the display device 10 while content is being presented. In this example, the self-calibration process may be managed by the dimming controller 32 of the controller 24 of each self-calibration illumination module 18. The dimming controller 32 may be configured to identify a calibration opportunity during runtime of the display device 10. For example, the dimming controller 32 may determine that a dimming target value 40 received from the system control bus 30 during runtime is above a threshold value, such as, for example, 80%, 90%, etc., and may determine that there is a calibration opportunity. The calibration process may potentially be more accurate for higher intensities of light. For example, if the light emitted from the light source 20 of a particular self-calibrating illumination module 18 has a lower intensity than light being emitted from neighboring modules, then the light sensor 22 for that particular self-calibrating illumination module 18 may potentially be impacted by optical crosstalk from the neighboring modules.

After determining that there is a calibration opportunity, the dimming controller 32 may be configured to determine a calibration target value 44 based at least on the dimming target value 40, and send the calibration target value 44 to the calibration factor scaler 34. The calibration target 44 may, for example, be the same value as the dimming target value 40. In other examples, the calibration target 44 may be determined based at least on the dimming target value 40. As a specific example, the dimming target value 40 may take the form of a percentage for a max current that may be supplied to the light source 20, such as, 10%, 20%, 100%, etc. The calibration target 44 may take the form of a corresponding expected luminance value for the light source 20 for that dimming target value 40. In one example, different types of displays may have different corresponding luminance values for the range of dimming values. That is, 10% dimming for one display may be mapped to a luminance value that is different than 10% dimming for another display that may be configured to be brighter as a default setting.

The calibration factor scaler 34 may then compare that calibration target 44, such as the expected luminance value for the light source 20 for the dimming target value 40, to a detected intensity of light 46 detected by the light sensor 22. The calibration factor scaler 34 may determine the calibration factor 42 based at least on a comparison between the detected intensity 46 of the light emitted from the at least one light source 20 and internally reflected within the display device 20 back toward the light sensor 22. In this manner, the calibration factor scaler 34 may compare the expected intensity of light that should be emitted from the light source 20 for the dimming target value 40 to the actual intensity of light as detected by the light sensor 22, and determine a calibration factor 42 that may be used to correct deviations in the light intensity. The calibration factor scaler 34 may then send the determined calibration factor 42 to the dimming controller 32.

In the example illustrated in FIG. 3B, the calibration target value 44 has a value of "100", which is a relative value that may correspond to a range of luminance values for light emitted from the light source 20. In other examples, the calibration target value 44 may have an absolute luminance value, a normalized value, or another type of value to represent the output of the light source 20. Similarly to the example of 3A, the light sensor 22 detected an intensity value of "104" for the internally reflected light. Based on a comparison, the calibration factor scaler 34 determines a calibration factor 42 of "−4%", which is sent to the dimming controller 32. The dimming controller 32 may then store the calibration factor 42 for adjusting subsequent control of current supplied to the light source 20 for subsequently received dimming target values 40. The dimming controller 32 may update the stored calibration factor 42 as the self-calibration process is performed at each calibration opportunity.

To control the current supplied to the light source 20 based on a received dimming target value 40, the dimming controller 32 of the controller 24 may be configured to determine a module dimming factor 48 based at least on the dimming target value 40 and module specific characteristics of that self-calibrating illumination module 18, such as, for example, characteristics of the anode power source 38, the light source 20, the current modulator 36, etc. The dimming controller 32 may send a dimming controller output 49 to the current modulator 36, which will control the current supplied to the light source 20 based at least on the dimming controller output 49.

As illustrated in FIG. 3B, the dimming controller output 49 may include the determined module dimming factor 48 for the current dimming target value 40, and the calibration factor 42. In one example, both values may be sent to the current modulator 36, which includes logic components to process both the module dimming factor 48 and the calibration factor 42 to control the current supplied to the light source 20. In another example, the dimming controller 32 may be configured to adjust the module diming factor 48 based at least on the calibration factor 42, and send the adjusted module dimming factor 48 to the current modulator 36 as the dimming controller output 49. In the specific example illustrated in FIG. 3B, the module dimming factor 48 determined for the dimming target value 40 has a value of "0.6", which may be a value for controlling the current supplied to the light source 20. The calibration factor 42 indicates that the module dimming factor 48 should be reduced by "−4%" in this specific example. Thus, the dimming controller 32 may multiply the module dimming factor 48 of "0.6" by "(1-0.04)", to determine a dimming controller output 49 value of "0.576". The dimming controller output 49 is sent to the current modulator 36, which controls the current supplied to the light source 20 accordingly.

Using the calibration processes described above with reference to FIGS. 3A and 3B, each individual self-calibration illumination module 18 of the backlight panel 16 may perform individual module-specific calibration processes to achieve the target dimming values specified by a timing controller of the display device 10.

Figure 4:
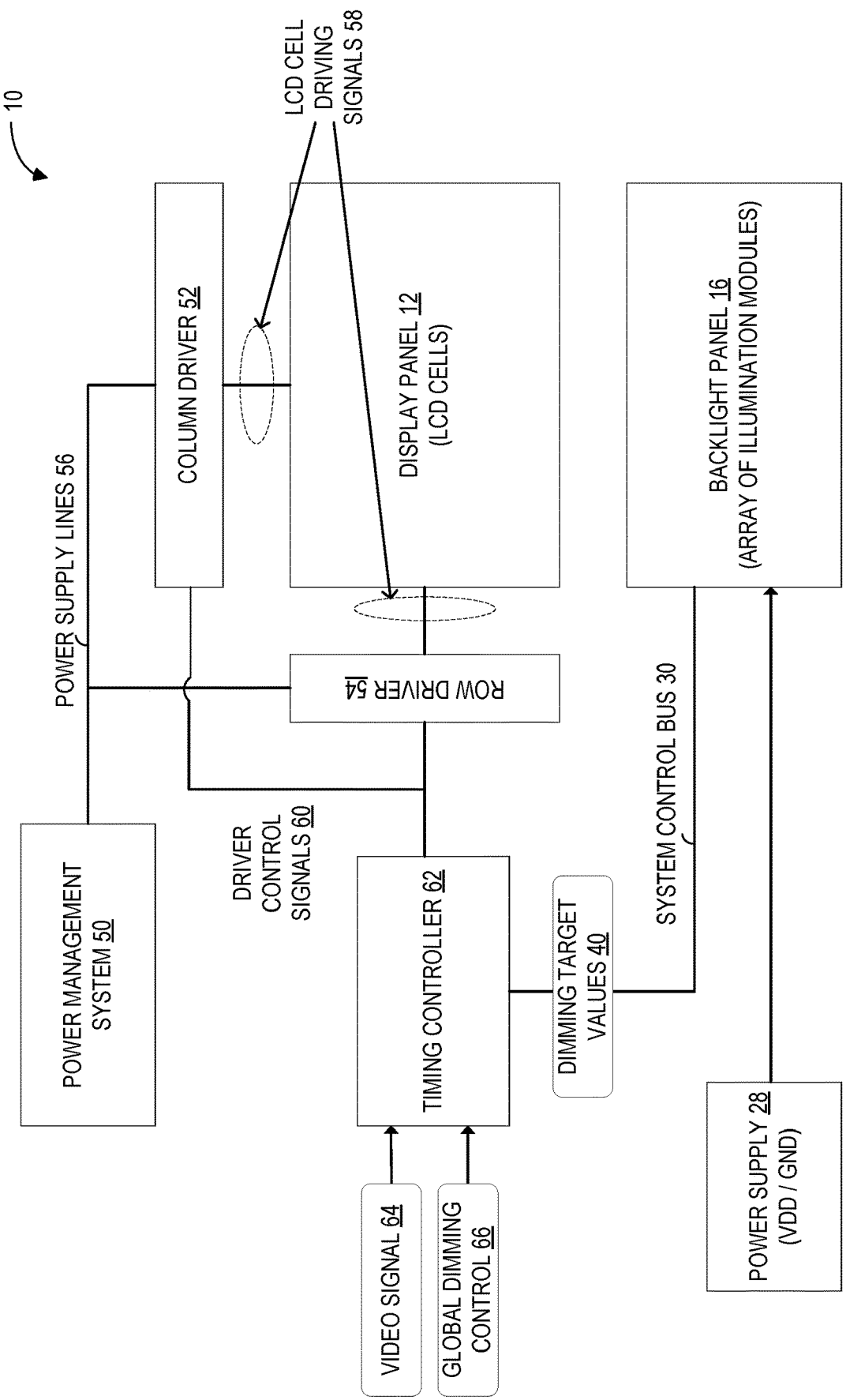
FIG. 4 shows a schematic view of a control scheme for controlling drive signals to a display panel and target dimming values for a backlight of the display device of FIG. 1.

FIG. 4 illustrates a schematic view of the display device 10 implementing the self-calibrating illumination modules 18 described above with reference to FIG. 3. As shown, the display device 10 may include a power management system 50 that supplies power to a column driver 52 and a row driver 54 via power supply lines 56 of the display device 10. The column and row drivers are configured to generate driving signals 58 for the display panel 12. In one example, the display panel 12 is an LCD panel that includes LCD cells, and the column driver 52 and the row driver 54 may be configured to generate LCD cell driving signals 58 for the display panel 12. As illustrated in FIG. 4, the column driver 52 and the row driver 54 may be configured to generate the driving signals 58 based on driver control signals 60 generated by a timing controller 62 of the display device 10.

The timing controller 62 may be configured to receive a video signal 64 for the content to be displayed using the display device 10. The video signal 64 may typically include video frames with pixel information such as color, luminance, etc. The timing controller 62 may also receive a global dimming control 66 that indicates a global diming value for the display device 10, which may, for example, take the form of a user controllable dimming setting. The timing controller 62 may generate the driver control signals 60 based on the pixel information in the video signal 64 and various display settings of the display device 10 such as, for example, aspect ratio, global color settings, etc. The timing controller 62 may also generate dimming target values 40 for each of the plurality of illumination modules 18 of the backlight panel 16. The dimming target values 40 may be determined based on the pixel information of the video signal 64 combined with the global dimming control 66. For example, pixels covering a sunny sky may correspond to higher dimming target values 40 than pixels covering a shaded area. The timing controller 62 may include a mapping of each illumination module 18 in the backlight panels 16 to specific segments of the display panel 12 that those illumination modules 18 illuminate. The timing controller 62 may then assign the dimming target values 40 based on the pixel information that will be displayed for those segments of the display panel 12. The respective dimming target values 40 are sent to the plurality of self-calibrating illumination modules via the system control bus 30.

In one example, the timing controller 62 does not store any calibration information for the backlight panel 16. As discussed above, conventional display device technologies require a calibration process to be performed during manufacturing of the display to calibrate the backlight panel 16. During the calibration process, a calibration factor is typically determined for each illuminator of the backlight panel 16 using optical measurements during manufacturing. The set of calibration factors are then stored and accessible to the timing controller 62. In conventional systems, the timing controller 62 may typically access the stored calibration factors to adjust the dimming target values 40 sent to each illuminator of the backlight panel. However, as discussed previously, these conventional calibration technologies have potential drawbacks of increased manufacturing costs, as well as degradation of luminance uniformity of the backlight over usage time of the display.

Thus, in one example, the display device 10 does not require such a calibration process, and does not store a map of calibration factors for each illumination module 18 that are accessible to the timing controller 62. Rather, the timing controller 62 only sends the dimming target values 40 determined based on the video signal 64 and the global dimming control 66, and does not send calibration factors to the plurality of self-calibrating illumination modules 18. Rather, each illumination module 18 performs individual module specific calibration, which provides the benefit of reducing manufacturing costs and mitigating luminance non-uniformity from occurring over the usage lifetime of the display device 10.

Figure 6:
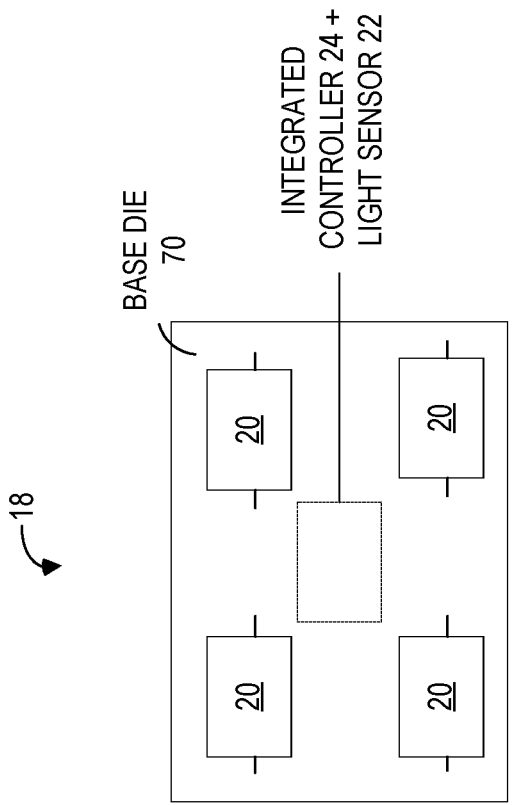
FIG. 6 shows another example self-calibrating illumination module that includes a plurality of light sources die-bonded onto a base semiconductor die for the display device of FIG. 1.
Figure 5:
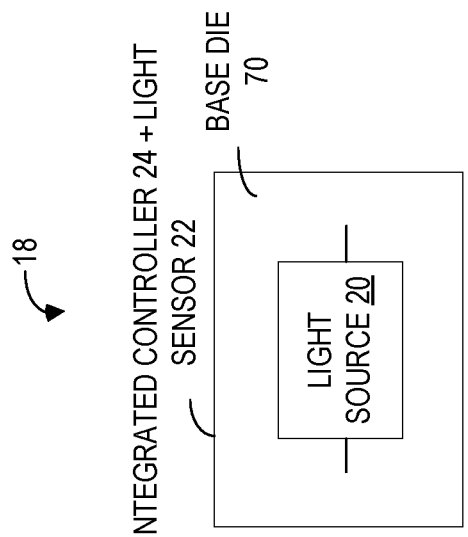
FIG. 5 shows an example self-calibrating illumination module that includes a single light source die-bonded onto a base semiconductor die for the display device of FIG. 1.

FIGS. 5 and 6 illustrates two example configurations of the self-calibrating illumination module 18. In the example of FIG. 5, the self-calibrating illumination module 18 includes a single light source 20, a single light sensor 22, and a single controller 24. In the example of FIG. 6, the self-calibrating illumination module 18 includes a plurality of light sources 20 that are controlled by a single controller 24. Although the example of FIG. 6 shows four light sources 20, it should be appreciated that each self-calibrating illumination module 18 may include other suitable numbers of light sources 20, such as, for example, 2, 3, 8, 16, etc.

In both examples of FIGS. 5 and 6, each self-calibrating illumination module 18 includes a base semi-conductor die 70 that integrates both the controller 24 and the light sensor 22. In one example manufacturing process, the light sensor 22 may be manufactured in the same semiconductor process node as the controller 24. The light sensor 22 and controller 24 may be made in a 0.13 Micron Bipolar complementary metal-oxide-semiconductor (BiCMOS) process. The light source 20 may then be die-bonded onto the base semiconductor die 70. In the example of FIG. 6, the plurality of light sources 20 may all be die-bonded onto the same base semiconductor die 70, and controlled by the integrated controller 24 and light sensor 22. In these examples, light sources 20 are poisoned on the base semiconductor die such that the light sensor 22 is arranged adjacently to the at least one light source 20. Using this arrangement, each light sensor 22 may detect the light emitted from the adjacent light source 20 that is internally reflected off of the color conversion layer.

Figure 7:
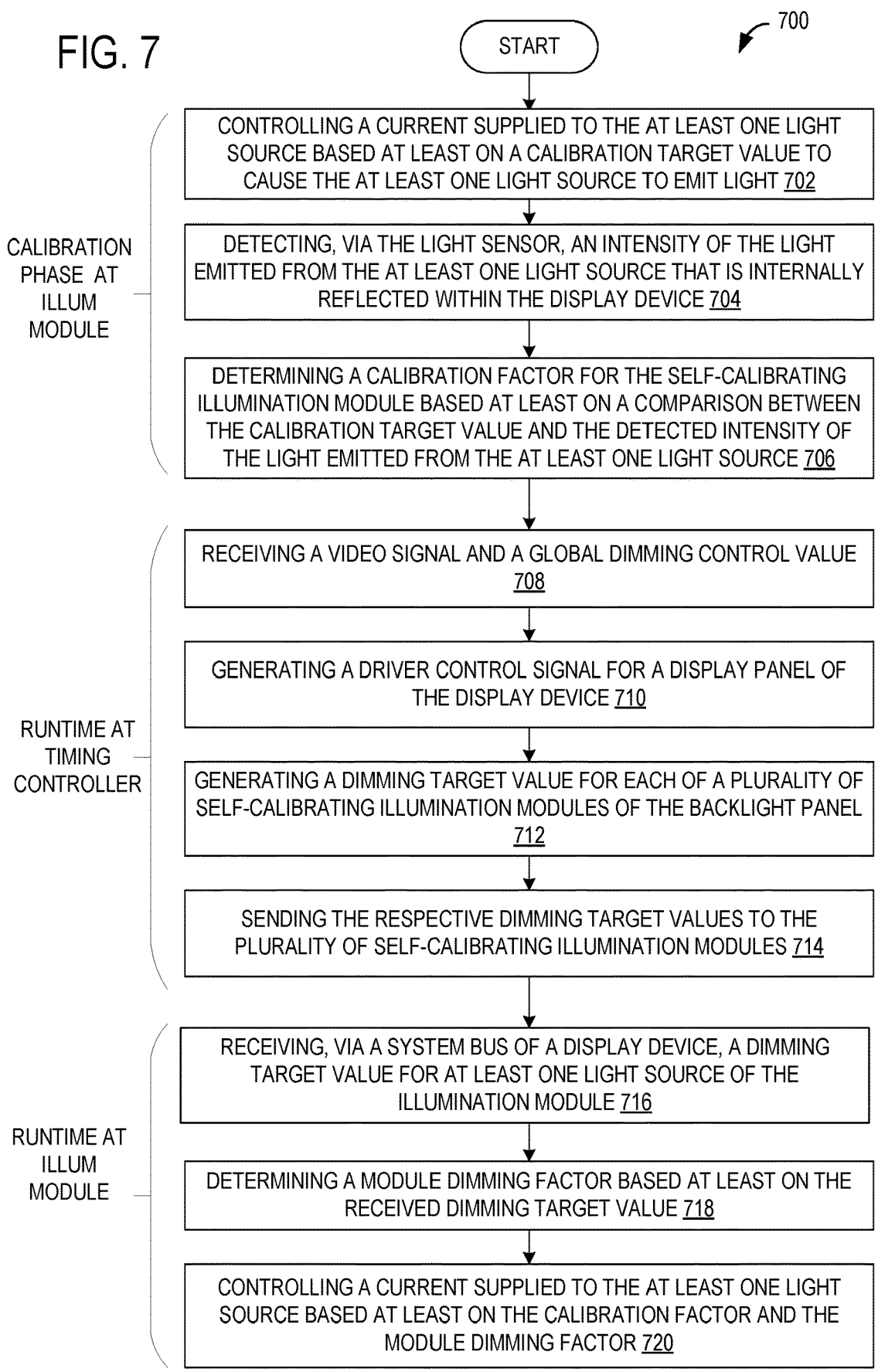
FIG. 7 shows a flowchart of an example method for controlling a self-calibrating illumination module for the display device of FIG. 1.

FIG. 7 shows a flowchart for an example method 700 for controlling a self-calibrating illumination device for a backlight of display device. Steps 702-706 of the method 700 may be performed at each illumination module 18 during a self-calibration phase. Steps 708-714 may be performed by a timing controller of the display device illustrated in FIG. 4. Steps 716-720 may be performed by a controller of each respective self-calibrating illumination device illustrated in FIG. 3 during runtime of the display device. However, it should be appreciated that steps of portions of steps of the method 700 may be performed by other computer components of the display device 700 in conjunction with the timing controller and the controller of each illumination module.

Steps 702-706 may be performed during a self-calibration process that may be initiated at a calibration opportunity. Example calibration opportunities include a start-up phase or shut-down phase of the display device. At step 702, the method 700 may include controlling a current supplied to the at least one light source based at least on a calibration target value to cause the at least one light source to emit light.

At step 704, the method 700 may include detecting, via a light sensor, an intensity of the light emitted from the at least one light source that is internally reflected within the display device.

At step 706, the method 700 may include determining a calibration factor for the self-calibrating illumination module based at least on a comparison between the calibration target value and the detected intensity of the light emitted from the at least one light source. The calibration factor may be stored on the controller of the self-calibrating illumination module, and may be adjusted each time the calibration process is performed.

Steps 708-714 may be performed during runtime of the display device at a timing controller. At step 708, the method 700 may include receiving a video signal and a global dimming control value. The video signal may be received from a computer device that is communicatively coupled to the display device. The video signal may include frames of pixel information for a video. In one example, the video signal may include HDR video content. The global dimming control may include global settings for the display device that may be set by a user of the computer device.

At step 710, the method 700 may include generating a driver control signal for a display panel of the display device. At step 712, the method 700 may include generating a dimming target value for each of a plurality of self-calibrating illumination modules of the backlight panel. At step 714, the method 700 may include sending the respective dimming target values to the plurality of self-calibrating illumination modules. In one example, the method 700 does not include sending a calibration factor for dimming to the plurality of self-calibrating illumination modules.

Each self-calibrating illumination module includes a respective controller that may be configured to perform steps 716-720 of the method 700. At 716, the method 700 may include receiving, via a system bus of a display device, a dimming target value for at least one light source of the illumination module. At 718, the method 700 may include determining a module dimming factor based at least on the received dimming target value. The module dimming factor may take the form of a value for controlling a current supplied to the light source to achieve the dimming target value, and may take into account the device specific characteristics of that illumination module.

At 720, the method 700 may include controlling a current supplied to the at least one light source based at least on the determined calibration factor and the module diming factor.

By implementing the self-calibrating illumination modules and control method described herein, the display device shown in FIG. 1 may mitigate the challenge of luminance non-uniformity of the backlight panel without requiring a manufacturer calibration process using optical measurements, which may provide the potential benefit of reduced manufacturer costs for the display. Further, the self-calibrating illumination modules may also continuously calibrate in real-time for the lifetime of the display device, which may provide the potential benefit of mitigating luminance non-uniformity caused by changes to the luminance characteristics of the illumination devices over usage time of the device.

Figure 8:
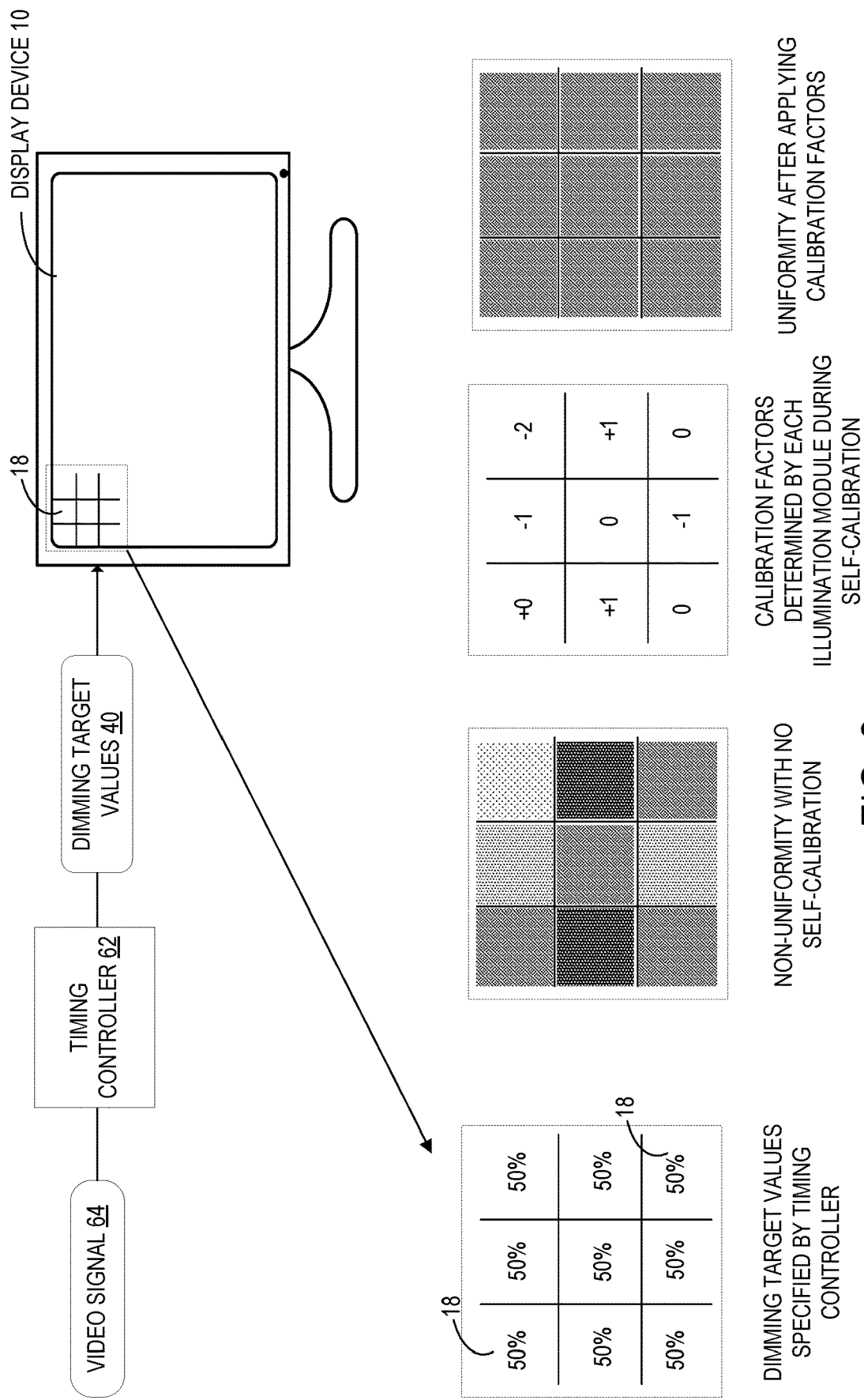
FIG. 8 shows an example result of each illumination module performing self-calibration functions to individually determine calibration factors that are applied to dimming target values received from a timing controller of the display device of FIG. 1.

FIG. 8 shows an example result of each illumination module 18 performing self-calibration functions to individually determine calibration factors 42 that are applied to dimming target values 40 received from a timing controller 62 of the display device 10. As shown, the timing controller 62 receives a video signal 64 and generates dimming target values 40 for each segment of the backlight panel of the display device 10. Specifically, the timing controller 62 may generate a dimming target value for each self-calibrating illumination module 18 of the backlight panel. The example illustrated in FIG. 8 shows an expanded view of nine segments of the backlight panel corresponding to nine different self-calibrating illumination modules 18 in the array arranged on the backlight panel. In this specific example, each of the nine illumination modules 18 are assigned the same dimming target value 40 of "50%". However, it should be appreciated that different dimming target values 40 may be sent to each respective illumination module 18 based on the pixel information of the video signal 64. Further, it should be appreciated that the dimming target value 40 may be represented using other ranges, such as, for example, a normalized value between 0 and 1.

However, even though the same dimming target value 40 was sent to each of the nine illumination modules 18 in the illustrated example, due to differences in luminance characteristics between respective light sources of the illumination modules 18, the resulting light that is actually emitted from those nine illumination modules 18 may have different intensities, resulting in non-uniformity in the intensity of the emitted light.

To address this potential issue, each of the illumination modules 18 are configured to perform the self-calibration method described herein. For example, each self-calibrating illumination module 18 includes a respective light sensor, as shown in FIG. 3, which is used to measure the actual intensity of light being emitted from that module. Each self-calibrating illumination module 18 may then individually and separately determines its own calibration factor based at least on a difference between a calibration target for the emitted light, and the actual measured intensity value for the emitted light. It should be appreciated that the calibration factors shown in FIG. 8 are merely exemplary, and that the calibration factors may take any suitable form, such as, for example, a scalar value that may be applied to the dimming target value 40. FIG. 8 further shows a result of each self-calibrating illumination module 18 applying its own individually determined calibration factor to the dimming target value 40 assigned to that self-calibrating illumination module 18, which is a uniformity in the intensity of light emitted from each self-calibrating illumination module 18 in response to the same dimming target value 40. In this manner, each self-calibrating illumination module 18 may separately determine how to control the power supplied to each respective light source in order to accurately achieve the dimming target value 40 supplied to that self-calibrating illumination module 18 by the timing controller 62.

Figure 9:
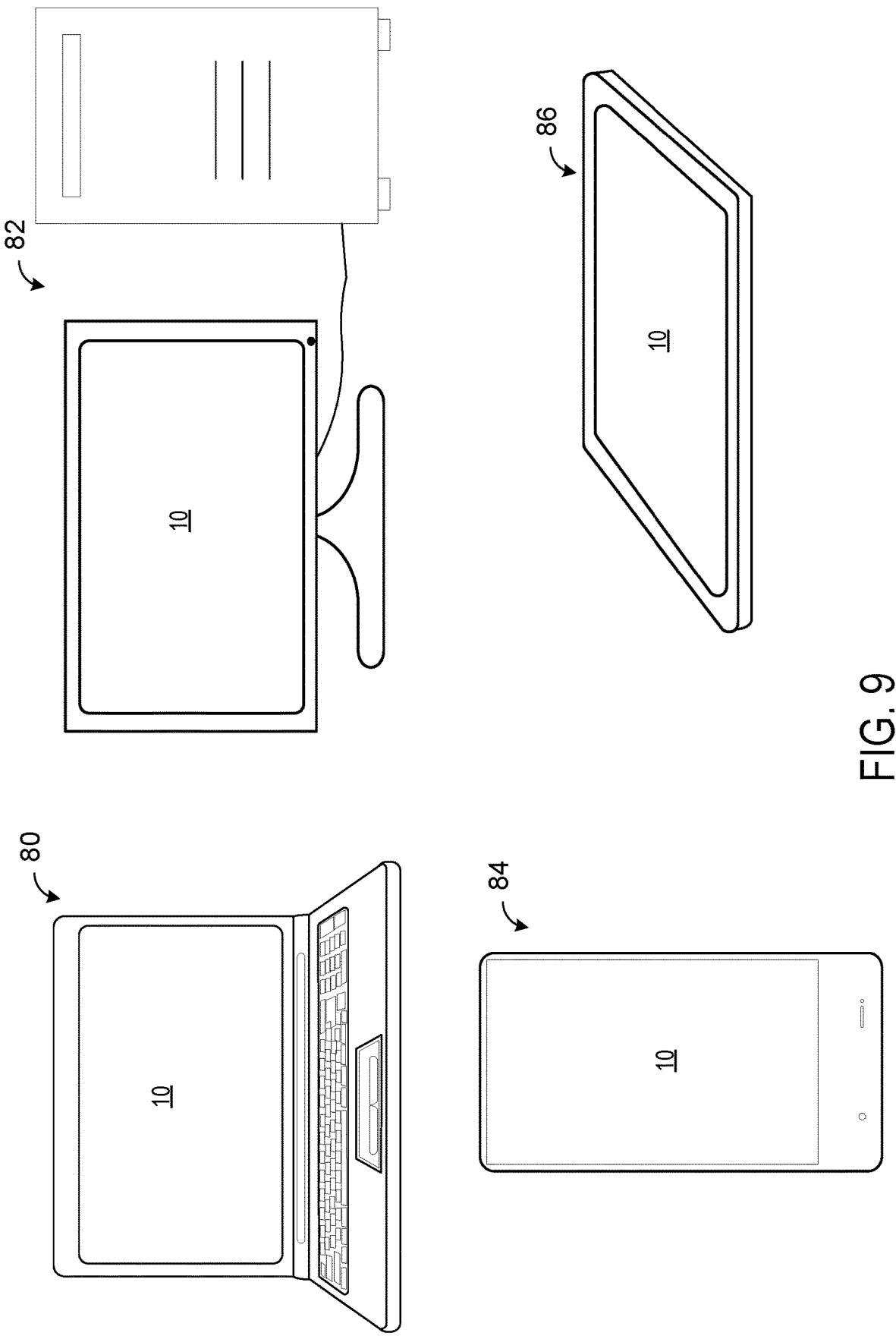
FIG. 9 shows several examples of computer devices with different form factors that include the display device of FIG. 1.

FIG. 9 shows several examples of computer devices with different form factors that may include the display device 10 described herein. In a first example, a laptop computer device 80 may include an integrated display device 10 that includes the self-calibrating illumination modules described herein. In a second example, a desktop computer device 82 may be electronically coupled to a stand-along display device 10 that includes self-calibrating illumination modules. In a third example, a handheld mobile computer device 84 may include an integrated display device 10 that includes self-calibrating illumination module 18. In a fourth example, a tablet computer device 86 may include an integrated display device 10 that includes self-calibrating illumination module 18. In these examples, the self-calibrating illumination modules 18 of the display devices 10 may include mini-LED light sources to achieve a thin form factor that may be integrated into thin displays, such as, for example, the integrated displays of the mobile and tablet computer devices. However, it should be appreciated that the illustrated form factors of the computer device are merely exemplary, and that other types of computer devices may include display devices that implement the self-calibrating illumination modules described herein.

In some embodiments, the methods and processes described herein may be tied to a computing system of one or more computing devices. In particular, such methods and processes may be implemented as a computer-application program or service, an application-programming interface (API), a library, and/or other computer-program product.

Figure 10:
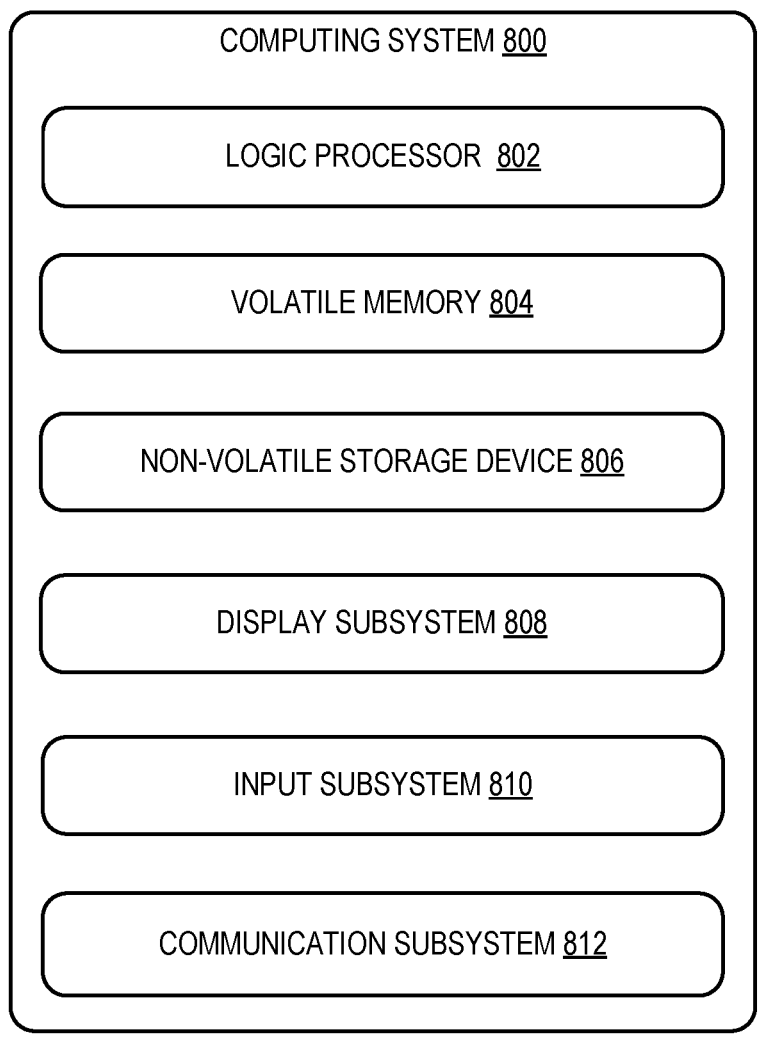
FIG. 10 shows a schematic view of an example computing environment in which a computer device that is coupled to the display device of FIG. 1 may be enacted.

FIG. 10 schematically shows a non-limiting embodiment of a computing system 800 that can enact one or more of the methods and processes described above. Computing system 800 is shown in simplified form. Computing system 800 may embody a computer system that provides the video signal 64 and the settings for the global dimming control 66 to the display device 10, such as the computer systems shown in FIG. 9. Computing system 800 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 800 includes a logic processor 802 volatile memory 804, and a non-volatile storage device 806. Computing system 800 may optionally include a display subsystem 808, input subsystem 810, communication subsystem 812, and/or other components not shown in FIG. 10.

Logic processor 802 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result. The logic processor 802 may also embody the controller 24, the timing controller 62, and other controllers of the display device 10.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 802 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 806 includes one or more physical devices configured to hold instructions executable by the logic processors to implement the methods and processes described herein. When such methods and processes are implemented, the state of non-volatile storage device 806 may be transformed—e.g., to hold different data.

Non-volatile storage device 806 may include physical devices that are removable and/or built-in. Non-volatile storage device 806 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 806 may include nonvolatile, dynamic, static, read/write, read-only, sequential-access, location-addressable, file-addressable, and/or content-addressable devices. It will be appreciated that non-volatile storage device 806 is configured to hold instructions even when power is cut to the non-volatile storage device 806.

Volatile memory 804 may include physical devices that include random access memory. Volatile memory 804 is typically utilized by logic processor 802 to temporarily store information during processing of software instructions. It will be appreciated that volatile memory 804 typically does not continue to store instructions when power is cut to the volatile memory 804.

Aspects of logic processor 802, volatile memory 804, and non-volatile storage device 806 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 800 typically implemented in software by a processor to perform a particular function using portions of volatile memory, which function involves transformative processing that specially configures the processor to perform the function. Thus, a module, program, or engine may be instantiated via logic processor 802 executing instructions held by non-volatile storage device 806, using portions of volatile memory 804. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 808 may be used to present a visual representation of data held by non-volatile storage device 806. The visual representation may take the form of a graphical user interface (GUI). As the herein described methods and processes change the data held by the non-volatile storage device, and thus transform the state of the non-volatile storage device, the state of display subsystem 808 may likewise be transformed to visually represent changes in the underlying data. Display subsystem 808 may include one or more display devices utilizing virtually any type of technology. Such display devices may be combined with logic processor 802, volatile memory 804, and/or non-volatile storage device 806 in a shared enclosure, or such display devices may be peripheral display devices.

When included, input subsystem 810 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 812 may be configured to communicatively couple various computing devices described herein with each other, and with other devices. Communication subsystem 812 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 800 to send and/or receive messages to and/or from other devices via a network such as the Internet.

The following paragraphs provide additional support for the claims of the subject application. One aspect provides a display device comprising a display panel, and a backlight panel including a plurality of self-calibrating illumination modules configured to provide backlighting for the display panel. Each self-calibrating illumination module includes at least one light source configured to emit light toward the display panel, at least one light sensor configured to detect light emitted from the at least one light source that is internally reflected within the display device, and a controller configured to control a current supplied to the at least one light source based at least on an intensity of light detected by the at least one light sensor.

In this aspect, additionally or alternatively, the controller of each self-calibrating illumination module may be configured to, at a calibration phase, control the current supplied to the at least one light source based at least on a calibration target value to cause the at least one light source to emit light, detect, via the light sensor, an intensity of the light emitted from the at least one light source that is internally reflected within the display device, and determine a calibration factor for that self-calibrating illumination module based at least on a comparison between the calibration target value and the detected intensity of the light emitted from the at least one light source.

In this aspect, additionally or alternatively, the controller of each self-calibrating illumination module may be configured to, at a runtime phase, receive a dimming target value for the at least one light source, and control the current supplied to the at least one light source based at least on the determined calibration factor for that self-calibrating illumination module and the dimming target value.

In this aspect, additionally or alternatively, the calibration phase may be performed by each self-calibrating illumination module at a calibration opportunity, and the calibration opportunity may include at least a period of time during a start-up phase of the display or a shut-down phase of the display.

In this aspect, additionally or alternatively, the display panel may be a liquid crystal display, and the at least one light source of each self-calibrating illumination module may be a light emitting diode. In this aspect, additionally or alternatively, the plurality of self-calibrating illumination modules may be arranged in an array on the backlight panel. In this aspect, additionally or alternatively, the display device may further include a color conversion layer arranged between the backlight panel and the display panel. In this aspect, additionally or alternatively, the light emitted from respective light sources of the plurality of self-calibrating illumination modules may be internally reflected off of the color conversion layer. In this aspect, additionally or alternatively, the color conversion layer may have a substantially uniform reflectivity. In this aspect, additionally or alternatively, each self-calibrating illumination module may include a single light source, a single light sensor, and a single controller. In this aspect, additionally or alternatively, each self-calibrating illumination module may include a plurality of light sources that are controlled by a respective controller of each self-calibrating illumination module. In this aspect, additionally or alternatively, each self-calibrating illumination module may include a base semi-conductor die that integrates both the controller and the light sensor, and the at least one light source may be die-bonded onto the base semi-conductor die. In this aspect, additionally or alternatively, for self-calibrating illumination module, the light sensor may be arranged adjacently to the at least one light source. In this aspect, additionally or alternatively, the display device may further include a timing controller configured to receive a video signal and a global dimming control value, generate a driver control signal for the display panel, generate a dimming target value for each of the plurality of self-calibrating illumination modules of the backlight panel, and send the respective dimming target values to the plurality of self-calibrating illumination modules. In this aspect, additionally or alternatively, a calibration factor for dimming may not be sent to the plurality of self-calibrating illumination modules.

Another aspect provides a method comprising, at a self-calibrating illumination module of a backlight panel of a display device, controlling a current supplied to at least one light source based at least on a calibration target value to cause the at least one light source to emit light, detecting, via a light sensor, an intensity of the light emitted from the at least one light source that is internally reflected within the display device, determining a calibration factor for the self-calibrating illumination module based at least on a comparison between the calibration target value and the detected intensity of the light emitted from the at least one light source, receiving, via a system bus of a display device, a dimming target value for at least one light source of the illumination module, determining a module dimming factor based at least on the received dimming target value, and controlling the current supplied to the at least one light source based at least on the determined calibration factor and the module dimming factor.

In this aspect, additionally or alternatively, at a timing controller of the display device, the method may further comprise receiving a video signal and a global dimming control value, generating a driver control signal for a display panel of the display device, generating a dimming target value for each of a plurality of self-calibrating illumination modules of the backlight panel, and sending the respective dimming target values to the plurality of self-calibrating illumination modules. In this aspect, additionally or alternatively, the method may not include sending a calibration factor for dimming to the plurality of self-calibrating illumination modules. In this aspect, additionally or alternatively, the light emitted from the light source may be internally reflected off of a color conversion layer arranged between the backlight panel and a display panel of the display device.

Another aspect provides a self-calibrating illumination module for a backlight panel of a display device comprising at least one light source, and at least one light sensor arranged adjacently to the at least one light source. The at least one light sensor is configured to detect light emitted from the at least one light source that is internally reflected within the display device. The self-calibrating illumination module further comprises a controller configured to control a current supplied to the at least one light source based at least on an intensity of light detected by the at least one light sensor.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A display device comprising:
    a display panel; and
    a backlight panel including a plurality of self-calibrating illumination modules configured to provide backlighting for the display panel;
    wherein each self-calibrating illumination module includes:
        at least one light source configured to emit light toward the display panel;
        at least one light sensor configured to detect light emitted from the at least one light source that is internally reflected within the display device; and
        a controller configured to control a current supplied to the at least one light source based at least on an intensity of light detected by the at least one light sensor;
    wherein the controller of each self-calibrating illumination module is configured to, at a calibration phase:
        control the current supplied to the at least one light source based at least on a calibration target value to cause the at least one light source to emit light;
        detect, via the at least one light sensor, an intensity of the light emitted from the at least one light source that is internally reflected within the display device; and
        determine a calibration factor for that self-calibrating illumination module based at least on a comparison between the calibration target value and the detected intensity of the light emitted from the at least one light source;
    wherein the calibration phase is performed by each self-calibrating illumination module at a calibration opportunity including:
        a dimming target value of the at least one light source being determined by the controller to be above a predetermined intensity threshold for a brightness of the at least one light source.

2. The display device of claim 1, wherein the controller of each self-calibrating illumination module is configured to:
    at a runtime phase:
        receive the dimming target value for the at least one light source; and
        control the current supplied to the at least one light source based at least on the determined calibration factor for that self-calibrating illumination module and the dimming target value.

3. The display device of claim 1,
    wherein the calibration opportunity includes at least a period of time during a start-up phase of the display or a shut-down phase of the display.

4. The display device of claim 1, wherein the display panel is a liquid crystal display, and the at least one light source of each self-calibrating illumination module is a light emitting diode.

5. The display device of claim 1, wherein the plurality of self-calibrating illumination modules are arranged in an array on the backlight panel.

6. The display device of claim 1, wherein the display device further includes a color conversion layer arranged between the backlight panel and the display panel.

7. The display device of claim 6, wherein the light emitted from respective light sources of the plurality of self-calibrating illumination modules is internally reflected off of the color conversion layer.

8. The display device of claim 6, wherein the color conversion layer has a substantially uniform reflectivity.

9. The display device of claim 1, wherein each self-calibrating illumination module includes a single light source, a single light sensor, and a single controller.

10. The display device of claim 1, wherein each self-calibrating illumination module includes a plurality of light sources that are controlled by a respective controller of each self-calibrating illumination module.

11. The display device of claim 1, wherein each self-calibrating illumination module includes a base semi-conductor die that integrates both the controller and the light sensor, and the at least one light source is die-bonded onto the base semi-conductor die.

12. The display device of claim 11, wherein for each self-calibrating illumination module, the light sensor is arranged adjacently to the at least one light source.

13. The display device of claim 1, further comprising a timing controller configured to:
    receive a video signal and a global dimming control value;
    generate a driver control signal for the display panel;
    generate the respective dimming target values for each of the plurality of self-calibrating illumination modules of the backlight panel; and
    send the respective dimming target values to the plurality of self-calibrating illumination modules.

14. The display device of claim 13, wherein a calibration factor for dimming is not sent to the plurality of self-calibrating illumination modules.

15. A method comprising:
    at a self-calibrating illumination module of a backlight panel of a display device:
        controlling a current supplied to at least one light source based at least on a calibration target value to cause the at least one light source to emit light;
        detecting, via a light sensor, an intensity of the light emitted from the at least one light source that is internally reflected within the display device;
        determining a calibration factor for the self-calibrating illumination module based at least on a comparison between the calibration target value and the detected intensity of the light emitted from the at least one light source;
        receiving, via a system bus of a display device, a dimming target value for at least one light source of the illumination module;
        determining a module dimming factor based at least on the received dimming target value; and controlling the current supplied to the at least one light source based at least on the determined calibration factor and the module dimming factor;

wherein the current supplied to the at least one light source is controlled at a calibration opportunity including:

the dimming target value of the at least one light source being determined by a controller to be above a predetermined intensity threshold for a brightness of the at least one light source.

16. The method of claim 15, further comprising:

at a timing controller of the display device:

receiving a video signal and a global dimming control value;

generating a driver control signal for a display panel of the display device;

generating the respective dimming target values for each of a plurality of self-calibrating illumination modules of the backlight panel; and sending the respective dimming target values to the plurality of self-calibrating illumination modules.

17. The method of claim 16, wherein the method does not include sending a calibration factor for dimming to the plurality of self-calibrating illumination modules.

18. The method of claim 15, wherein the light emitted from the light source is internally reflected off of a color conversion layer arranged between the backlight panel and a display panel of the display device.

19. A self-calibrating illumination module for a backlight panel of a display device comprising:

at least one light source;

at least one light sensor arranged adjacently to the at least one light source, the at least one light sensor being configured to detect light emitted from the at least one light source that is internally reflected within the display device; and a controller configured to control a current supplied to the at least one light source based at least on an intensity of light detected by the at least one light sensor;

wherein the controller of the self-calibrating illumination module is configured to, at a calibration phase:

control the current supplied to the at least one light source based at least on a calibration target value to cause the at least one light source to emit light;

detect, via the at least one light sensor, an intensity of the light emitted from the at least one light source that is internally reflected within the display device; and determine a calibration factor for the self-calibrating illumination module based at least on a comparison between the calibration target value and the detected intensity of the light emitted from the at least one light source;

wherein the calibration phase is performed by the self-calibrating illumination module at a calibration opportunity including:

a dimming target value of the at least one light source being determined by the controller to be above a predetermined intensity threshold for a brightness of the at least one light source.

* * * * *